Figure 1:
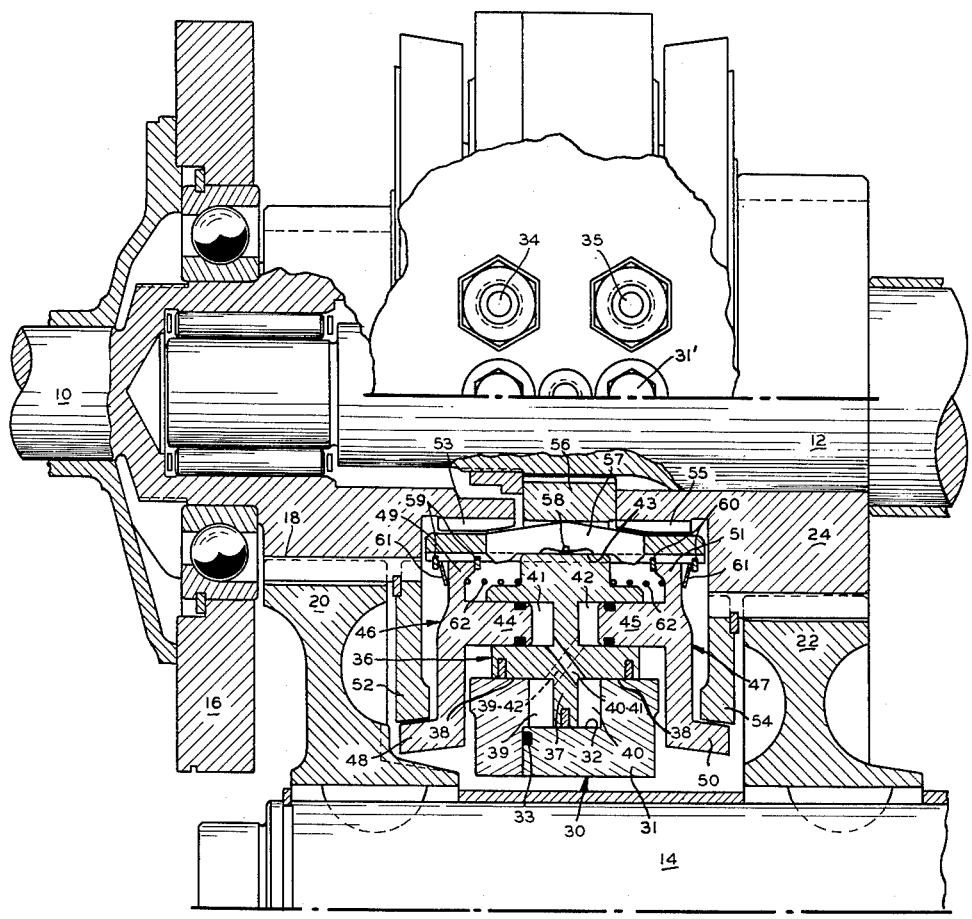

March 13, 1962 D. S. DENCE ET AL 3,024,885
CLUTCH
Filed Dec. 11, 1957 3 Sheets-Sheet 1

INVENTORS.
DONALD S. DENCE
MARK A. DEMING
BY
J. Frederick Bechtel
ATTY.

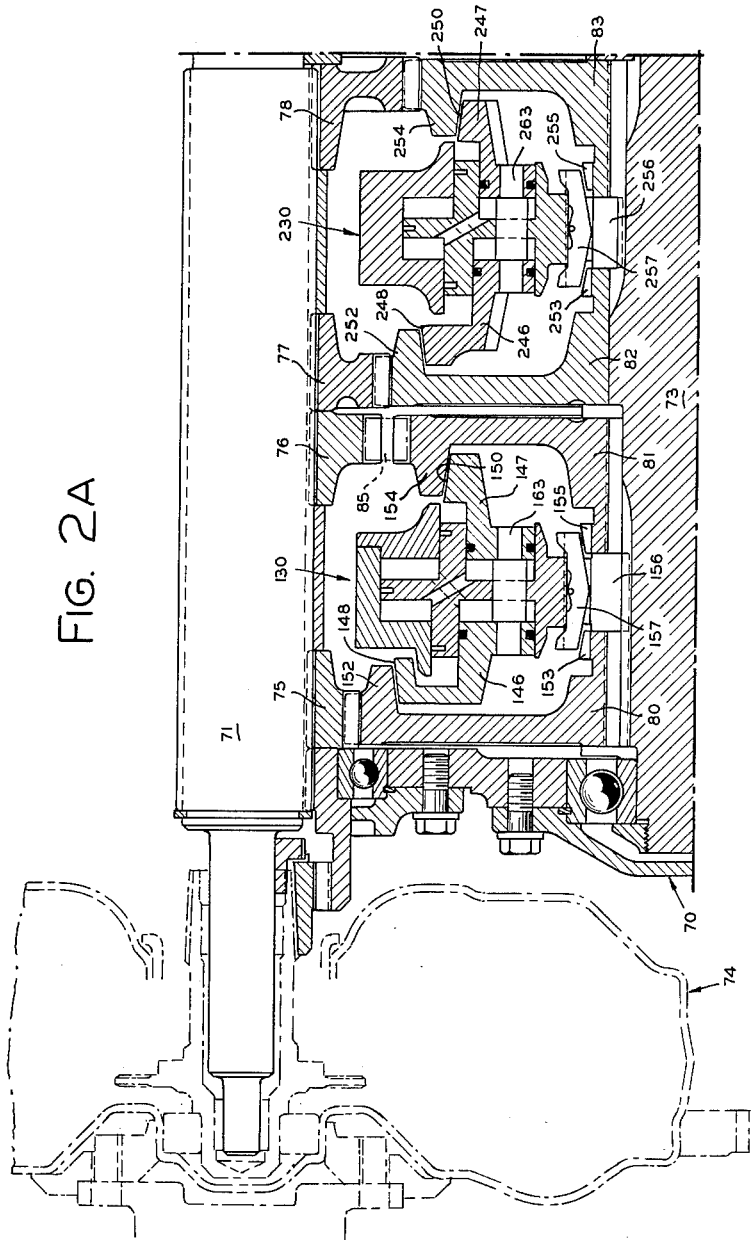

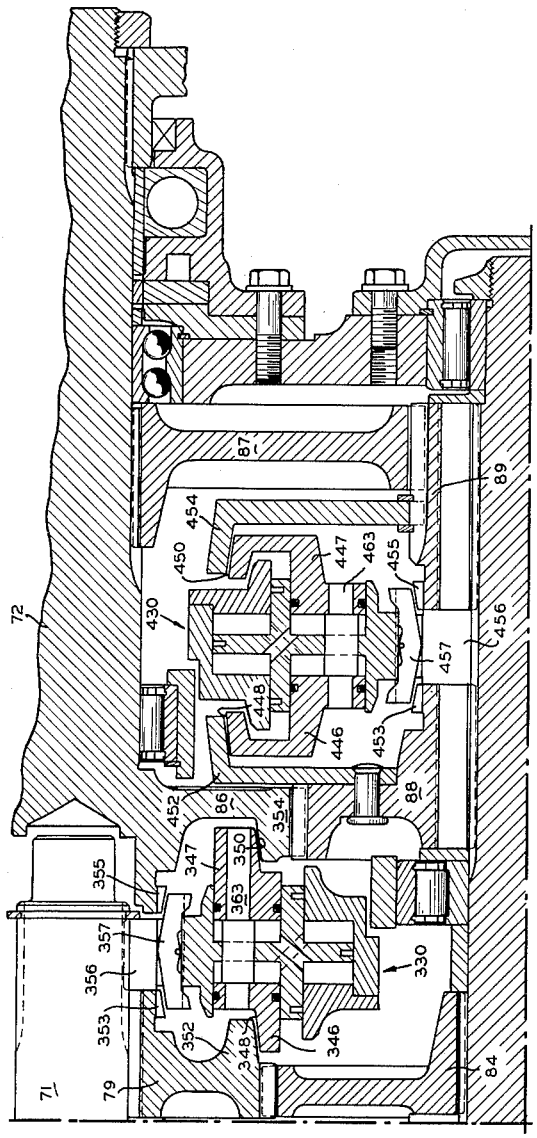

3,024,885
CLUTCH
Donald S. Dence, Jackson, and Mark A. Deming, Albion, Mich., assignors to Clark Equipment Company, a corporation of Michigan
Filed Dec. 11, 1957, Ser. No. 702,034
10 Claims. (Cl. 192—53)

The present invention relates to improved clutch means for engaging the gears or other torque transmitting means in change speed transmissions and the like.

A principal object of the invention is to provide an improved gear engaging means or clutch including frictionally engageable clutch surfaces and positively engageable clutch parts brought into engagement sequentially to insure a smooth clutching function and to accommodate interengagement of the positively coupled clutch parts without clashing. More particularly, it is an object of the invention to provide an improved double acting gear engaging means or clutch of economical and practical construction including two pair of frictionally engageable clutch surfaces and two pair of positively engageable clutch parts, one pair of the frictionally engageable surfaces and one pair of the positively engageable parts being sequentially operable frictionally and positively to couple driving and driven members, and the other pairs of the two types of clutch elements being sequentially operable separately of the said one pairs of clutch elements to couple the driving and driven members in a different ratio or to couple one or the other of the two members to a different member.

An additional object of the invention is the provision of an improved gear engaging means in accordance with the foregoing affording improved control of clutch elements, especially improved fluid pressure actuation of clutch elements.

Other objects and advantages of the present invention will become apparent in the following detailed description of preferred embodiments of the invention.

Now in order to acquaint those skilled in the art with the manner of making and using the improved clutch of our invention, we shall describe, in connection with the accompanying drawings, a preferred embodiment of the clutch of the invention.

In the drawings, wherein like reference numerals indicate like parts:

FIGURE 1 is a side view, partly in section and partly in elevation, of the improved gear engaging means or clutch of the invention; and FIGURES 2A and 2B together comprise a longitudinal sectional view of a transmission embodying a modification of our invention.

Referring now to the drawings, we shall first describe one embodiment of our improved gear engaging means or clutch and then shall describe a slightly different embodiment of the clutch.

In FIGURE 1, we have shown our gear engaging mechanism or clutch as disposed between a drive shaft or member 10 and a driven shaft or member 12 selectively to couple the two shafts at one speed ratio, to couple the two shafts in a second speed ratio and to uncouple the shafts. In the particular apparatus shown, the shafts 10 and 12 are to be coupled at various speed ratios and a countershaft shaft 14 is provided to accommodate such coupling. As will become apparent as the description proceeds, the particular arrangement would also accommodate selective drive from the shaft 10 to either of the shafts 12 and 14 if that were to be desired. The application of our clutch to a variety of other selective coupling problems will be apparent to those skilled in the art. In addition to the shafts 10, 12 and 14, the apparatus shown in FIGURE 1 includes, with the exception of the improved clutch to be described, a housing 16 in which the shafts 10, 12 and 14 are rotatably supported, the shafts 10 and 12 being disposed in axial alignment with the forward end of the shaft 12 journalled in a rearward tubular portion of the shaft 10 and the countershaft 14 disposed in spaced parallel relation to the shafts 10 and 12, suitable bearings being provided in the housing to support the shafts. A first gear 18 is fixed to and preferably formed integrally with the shaft 10 and this gear meshes with a second gear 20 keyed to the countershaft 14. A third gear 22 is likewise keyed to the countershaft 14 in axially spaced relation to the gear 20, the gear 22 meshing with a fourth gear 24 rotatably mounted on the driven shaft 12. The gears 18, 20, 22 and 24 are all of different diameter and have different numbers of teeth, as is conventional, so that as the shaft 10 and gear 18 are rotated, the countershaft 14 and gears 20 and 22 are rotated at a different speed than shaft 10 and the gear 24 is rotated at a speed different than the speed of rotation of the shafts 10 and 14.

The clutch means of the present invention is indicated generally at 30 and is disposed generally annularly about the shafts 10 and 12 in the space between the gears 18 and 24 and between the gears 20 and 22. The clutch means 30 comprises an annular housing 31 encompassing the remainder of the clutch parts and having a circumferential groove 32 in the inner cylindrical surface thereof. Preferably, the housing 31 is formed of at least two separable parts to facilitate the formation of the groove 32 and to accommodate ready assembly and disassembly of the clutch, the housing parts being sealed with respect to one another by means of an annular seal 33. The clutch housing 31 is secured to the apparatus housing 16 by means of bolts 31' or the like, and a pair of fluid inlet ports 34 and 35 provided in the housing 16 communicate at longitudinally spaced points with the groove 32 in the housing 31. Mounted within the housing 31, for sliding movement axially thereof, and for rotary movement with respect thereto, is an annular hub member 36, which member is circumferentially recessed at the outer edge portions or corners thereof to define a radial fin or flange 37 slidably and rotatably received with substantial axial clearance in the groove 32 in the housing 31 and a pair of cylindrical surfaces 38 to the opposite sides of the fin slidably and rotatably engaging the inner cylindrical wall portions of the housing 31. The fin 37 and the surfaces 38 of the hub member 36, in conjunction with the housing 31 and the recess 32 therein, thus define a pair of annular cylinders or cavities 39 and 40, with the fin 37 constituting a common piston for both cylinders. In addition, the opposite radial faces of the hub member 36 are annularly recessed radially inwardly of the surfaces 38 thereof, coaxially of the hub and housing, to define a second pair of annular cylinders or cavities 41 and 42. In the embodiment shown, the cylinders or cavities 39 and 40 are of the same size and are aligned axially of the clutch, as are the cylinders 41 and 42. Variations may be made in this arrangement, if desired. In either of the embodiments shown or variations thereof, the cylinders 39 and 40 are of a greater radial area than the cylinders 42 and 41, respectively, and the cylinders 41 and 42 are of a greater area than the area differential between the cavity 39 and cylinder 42 and the cavity 40 and the cylinder 41, respectively, for a purpose to be described. The cylinders 39 and 42 are inter-connected by a diagonal port 39—42 in the hub 36, and the cylinders 40 and 41 are similarly inter-connected by a diagonal port 40—41 in the hub 36. At the radial inward margin thereof, the hub member 36 terminates in a generally cylindrical cam surface 43, the purpose of which will be described in detail hereinafter.

The annular cylinders 41 and 42 in the hub member 36 slidably receive annular piston portions 44 and 45, respectively, of a pair of friction clutching elements 46 and 47, respectively, which are fixed for rotation but are axially slidable with respect to the hub 36. The clutch element 46 projects outwardly to one side of the hub member and clutch housing and in spaced parallel relation thereto includes an annular radial flange portion having an annular axially extending flange 48 at the outer periphery thereof, at least one surface of which, the inner surface in the embodiment shown, is of frusto-conical configuration. The radial flange also extends radially inwardly from the annular piston portion 44 of the element 46 to define a locating or stop portion 49 encircling the shafts 10 and 12. The clutching element 47, in the present embodiment of the invention, is identical to the element 46, the same including a piston portion 45, an axially extending annular flange 50 defining a frusto-conical surface, and a locating or stop portion 51. While the arrangement described is preferred in the embodiment shown, identical formation of the elements 46 and 47 is not essential and variations in the relative size and form of the elements may be effected as desired or required within the skill of the art.

In view of the foregoing, it is to be appreciated that the clutch housing 31 is stationary, that the hub member 36 and clutch elements 46 and 47 are individually axially slidable and conjointly rotatable with respect to the housing, and that the clutch elements 46 and 47 are individually slidable axially of the clutch with respect to the hub member. Suitable seals are provided on the hub member 36 and on the pistons 44 and 45 to maintain a hydraulically sealed relationship between the components.

The frusto-conical surfaces defined by the flanges 48 and 50 of the clutch elements 46 and 47 constitute friction clutching surfaces and are adapted to cooperate with various ones of the gears and shafts previously described. Specifically, the embodiment of the invention shown in FIGURE 1 includes an annular radial flange 52 fixed to or formed integrally with the shaft 10 and gear 18 and defining at the periphery thereof a frusto-conical surface complementary to and frictionally engageable by the frusto-conical flange 48 of the clutch element 46. In addition, the clutching element means comprising the flange 52 includes a positively engageable clutch part in the form of a tooth element 53, suitably a spur gear, fixed to or formed integrally with the shaft 10, the gear 18 and/or the flange 52. Similarly, clutching element means is provided at the opposite side of the clutch housing for cooperation with the friction clutch flange 50 of the clutch element 47, the second clutch element means including an annular radial flange 54 having a frusto-conical peripheral margin fixed to or formed integrally with the gear 24 and a positively engageable tooth part 55 fixed to or formed integrally with the gear 24 and/or the flange 54.

Intermediate the positively engageable clutch parts 53 and 55, the clutch of the invention includes a body member or carrier 56 of annular form which, in the present embodiment, is of circumferentially interrupted T-shape in longitudinal cross section and is fixed or keyed at its inner cylindrical surface, at the base of the leg of the T, to the driven shaft 12, the head portions of the T extending over and encircling the clutch parts 53 and 55. The carrier 56 is provided with a plurality of circumferentially spaced longitudinally extending radial slots in the head portion of the T thereof, and each slot is adapted for the reception of a rocker or double acting clutch part 57 which is pivotally mounted in the respective slot by means of a pin 58. Clutch parts of substantially the same form and assembly have been disclosed in patents granted to the assignee of the present invention, for example, Patent No. 2,412,208, issued December 10, 1946, to Donald S. Dence. Generally, each rocker 57 extends longitudinally of the carrier 56, is fulcrummed intermediate its ends on the carrier, and has the opposite ends thereof disposed in radial overlying relation to the clutch parts 53 and 55. At the radially inward edge thereof, each clutch part or rocker 57 has opposed inclined portions converging radially inwardly at the midpoint of the part to define a rocker or fulcrum surface and at the radially outward edge thereof is of a particular cam formation, which cam edge engages and is cooperable with the cam surface 43 of the hub member 36. Specifically, at the opposite ends thereof, each clutch part 57 includes radially outwardly extending portions spaced apart by at least the width of the cam surface 43 and the mid-portion thereof is radially recessed so that as the hub 36 is moved in one direction the clutch part 57 will be rocked radially inwardly at the end thereof in the direction the hub is moved to engage and eventually mesh one set of ends of the clutch parts 57 with the respective one of the tooth clutch parts 53 or 55. The cam portion 43 of the hub 36 is provided with a plurality of circumferentially spaced slots, complementary to the slots in the carrier 56 and the two members are interfitted so as to couple the same for conjoint rotation and relative axial movement. The head portions of the T-shaped carrier 56 extend longitudinally beyond both ends of the clutch parts 57 and at each end portion thereof carry a pair of longitudinally spaced stop rings 59 and 60, respectively, between which the locating or stop portions 49 and 51 of the friction clutch elements 46 and 47, respectively, are slidably received, the rings thus defining the limits of movement of the elements 46 and 47. Normally to retain the clutch elements 46 and 47 in their axially inward positions with respect to the hub member 36 and housing 31, prestressed spring washers 61 are confined between the outboard ring 59 and the stop portion 49 and between the outboard ring 60 and the stop portion 51, respectively. Normally to center the friction clutch elements 46 and 47 and the hub 36 with respect to the clutch housing 31 and carrier 56, helically coiled compression springs 62 are disposed between the clutch stop portions 49 and 51 of the elements 46 and 47 and the opposite sides of the hub 36.

Having thus described the structure and assembly of the disclosed embodiment of the clutch of the invention, operation of the clutch is as follows: With the shaft 10 rotated in a given direction at a given speed by suitable drive means, the gear 18 is rotated at the same speed in the same direction, the gear 20, countershaft 14 and gear 22 may be rotated at the same speed or faster or slower (slower in the apparatus shown) and in the opposite direction, and the gear 24 may be rotated at the same speed as the countershaft 14 or faster or slower (intermediate the speeds of the shafts 10 and 14 in the embodiment shown) and in the same direction as shaft 10. By interposition of idler gears, reverse operation of the shaft 14 and gear 24 may be obtained as is known in the art. With the clutch 30 at rest, as is shown in FIGURE 1, the clutch mechanism and the driven shaft 12 are maintained stationary. To couple the shafts 10 and 12 for relatively low speed drive, fluid under pressure, preferably hydraulic fluid, is supplied to the inlet 34 from whence the fluid flows to the cavity 39, through the port 39—42 and into the cylinder 42. As fluid pressure builds up, the piston 45 is forced axially outwardly with respect to the hub 36. The piston 45 moves more rapidly than the hub 36 for the reason that the area of the piston exposed to fluid under pressure is greater than the effective area of the hub 36; i.e., one side of the hub 36 is exposed in the cavity 39 and the opposite side thereof is exposed in the cavity 42, the area differential between cavities 39 and 42 being less than the area of piston 45. As the piston 45 is moved, the friction clutch surface of the flange 50 on the clutch element 47 is moved toward and into engagement with the complementary surface on the clutch element 54. Since the element 54 is fixed to the gear 24, and since the clutch element 47, hub 36, carrier or body member 56 and shaft 12 are all locked together for conjoint rotation, the clutch elements 47 and 54 frictionally couple the driven shaft 12 to the gear 24 through carrier 56, and through the gear 22, countershaft 14 and gears 20 and 18, to the drive shaft 10.

The clutch elements 47 and 54 are both preferably formed of metal and define frusto-conical engaging surfaces to transmit a high percentage (up to 100%) of the torque from the drive shaft 10 to the driven shaft 12. To accommodate ready release of the conical clutch surfaces, we have found that an angle of inclination of 5½ degrees or more is suitable, the angle preferably being retained relatively low to insure a highly effective frictional grip between the two surfaces. For purposes of present application, we prefer to employ an inclination of approximately 7 degrees for the clutching surfaces.

As pointed out above, the hydraulic fluid within the cylinders 39 and 42 exerts an equal pressure in both of the cylinders, but exerts its pressure over a greater effective area in the cylinder 39 than in the cylinder 42. Because of the area differential between the radial surface of the cavity 42 and the radial surface of the fin 37, fluid under pressure actuates the hub member 36 in the same direction as it actuates the clutch element 47. Movement in the selected direction of the hub member 36 and the clutch element 47 commences simultaneously, but, as a result of the greater effective area of the piston 45 than of the hub 36, the hub moves at a predeterminately slower rate than the piston. As axial shifting of the hub 36 occurs, the cam 43 thereof rocks the ends of the clutch parts 57 adjacent the gear 24 radially inward into engagement with the toothed clutch part 55 on the gear 24. This latter action occurs, of course, slightly later in time than the occurrence of frictional engagement between the clutch elements 47 and 54. If the clutch parts 57 align with the spaces between the teeth of the part 55, the parts 55 and 57 will intermesh to positively lock the gear 24 to the shaft 12, which positive lock-up is additional to the pre-existing frictional coupling of the two. If the clutch parts 57 do not immediately align with the space between the teeth of the part 55, the hub 36 and fluid under pressure will maintain a biasing force on the clutch parts 57, and upon slight slippage of the friction clutch elements, the positively engageable clutch parts 55 and 57 will inter-mesh. Since the gear 24 is coupled to the clutch 30 by the elements 47 and 54 for substantially conjoint, synchronous rotation, the positively engageable clutch parts will not clash, but will effect a smooth, noiseless, positive interlocking of the shaft 12 and gear 24.

Because of the automatic sequential engagement of the friction clutching elements and the positively engageable clutching elements, the clutch of the invention will smoothly and uniformly transmit torque from the shaft 10 to the shaft 12 to bring the shaft 12 up to speed and thereafter will lock the shaft 12 in driving relation to the shaft 10 without clashing and without application of sudden impact to the positively engageable clutch parts. Furthermore, once the clutch has been fully engaged, only a minimum force is required to maintain the clutch elements in engagement. Accordingly, the pressure maintained on the hydraulic fluid in the system may be drastically reduced after positive engagement of the clutch to reduce the horsepower draw from the prime mover for pumping purposes and to accommodate use of the horsepower output normally required for the pump in conventional hydraulic mechanisms for purposes of power output from the driven shaft 12. For example, in one embodiment of our invention we have adopted a pump pressure of 300 p.s.i. to effect efficient actuation of the clutch mechanism, with a subsequent reduction, following a positive lock-up between clutch part 57 and gear 53 or 55, to a pump pressure of 30 p.s.i. In addition to a substantial horsepower saving, this reduction in fluid pressure accommodates rapid venting of the hydraulic cylinders in the clutch to uncouple the clutch elements. Upon release of fluid pressure, as will be apparent, the springs 61 and 62 rapidly return the clutch parts 36, 47 and 57 to their normal positions.

To afford the other clutching function of the clutch of the invention, fluid under pressure is supplied to the port 35 and thence to the cylinders 40 and 41 to move the piston 44, frictionally to engage the clutch elements 46 and 52, and subsequently to engage the positive clutch elements 53 and 57 in a manner obvious from the foregoing description. In the structure shown in FIGURE 1, the clutch in this condition of actuation directly connects the drive shaft 10 and driven shaft 12 for conjoint operation at a 1 to 1 ratio.

From the foregoing, it is to be appreciated that the present invention affords an improved clutch of particularly economical and compact structure including improved means for effecting fluid pressure or hydraulic operation of the same with utmost simplicity. The clutch is double acting, affording two clutching functions with a minimum of parts, and provides sequential engagement in both clutching functions of frictionally engageable clutch parts and positively engageable clutch parts. The frictionally engageable clutch parts insure transmission of substantially full torque and accommodate subsequent engagement of the positively engageable clutch parts without sudden impact and without clashing. Various applications of the described clutch will be apparent to those skilled in the art from the preceding description and will will become more fully apparent in the following description of an improved transmission incorporating the clutch, the improved transmission to be described exemplifying the capabilities of our clutch mechanism.

Referring now to FIGURE 2, we have shown a modification of our invention in conjunction with a transmission comprising a housing 70, a drive shaft 71 rotatably supported in the housing, a driven shaft 72 rotatably supported in the housing in axially aligned and juxtaposed relation to the shaft 71, and a countershaft 73 rotatably supported in the housing in spaced parallel relation to the shafts 71 and 72. As shown, the countershaft 73 has portions thereof coextensive with each of the shafts 71 and 72. The drive shaft 71 is adapted to be rotated directly by any conventional prime mover (not shown); however, a torque converter 74 of conventional construction may be used. Within the housing 70, at longitudinally spaced points along the length thereof, the shaft 71 carries a plurality of gears 75, 76, 77 and 78, each of which is keyed to the shaft. In addition, the shaft 71 rotatably supports a gear 79 and has keyed thereto the carrier member 356 of a clutch mechanism 330. The gears 75, 77, 78 and 79 are preferably of increasing diameter, the gear 75 being mounted adjacent the drive end of the shaft, the gears 76 and 77 and gears 78 and 79 being grouped on the shaft, and the carrier member 356 being keyed to the shaft adjacent the gear 79 and adjacent the opposite end of shaft 71. Along the length of the portion thereof coextensive with the drive shaft 71, the countershaft 73 rotatably supports a number of gears 80, 81, 82 and 83, which are aligned transversely of the shafts 71 and 73 with the gears 75, 76, 77 and 78 respectively. In addition, a gear 84 is keyed to the countershaft 73 in transverse alignment with the gear 79. The gears 80, 82, 83 and 84 are of progressively decreasing diameter, in accordance with the increasing diameter of the gears 75, 77, 78 and 79, and are meshed directly with the gears 75, 77, 78 and 79, respectively. The gear set 76—81 is intended for reverse drive of the driven shaft 72 and the gears 76 and 81 each mesh with an idler gear 85 disposed between the two gears.

The driven shaft 72 is juxtaposed to the drive shaft 71 and at the end thereof adjacent the shaft 71 carries a gear 86, which may suitably be formed integrally with the shaft. Rearwardly of the gear 86, the shaft 72 also carries a gear 87 which is suitably keyed to the shaft. The gears 86 and 87 are of different diameters to afford different transmission ratios, the gear 87 preferably being of substantially greater diameter than the gear 86. In transverse alignment with the gears 86 and 87, the countershaft 73 rotatably supports a pair of gears 88 and 89 which mesh directly with the gears 86 and 87, respectively.

The above-described transmission includes four of the improved clutches described hereinbefore, namely, clutches 130, 230, 330 and 430. Because of the substantial identity between the clutches incorporated in the transmission and the clutch previously described, the components of the four clutches similar or identical to the components of the previously described clutch are indicated by the same tens and digits reference numerals as applied in FIGURE 1, the components of the first clutch being indicated by the said numerals in the 100 series, the second clutch in the 200 series, and the third clutch in the 300 series and the fourth clutch in the 400 series. As shown, the clutches 130, 230, and 430 encircle the countershaft 73 and each have the carrier thereof, 156, 256 and 456, respectively, keyed to the countershaft 73, the said clutches being disposed respectively between the gear sets 75—80 and 76—85—81, the gear sets 77—82 and 78—83, and the gear sets 86—88 and 87—89. The clutch 330 encircles the drive shaft 71 between the gear sets 79—84 and 86—88 and, as previously pointed out, has its carrier 356 keyed to the drive shaft 71.

The clutch mechanisms 130, 230, 330 and 430 are substantially the same as the clutch described in detail in conjunction with FIGURE 1. Common departures of the clutches 130, 230, 330, and 430 is that the movable friction clutching elements (46, 47) of each clutch are inter-connected at the piston portions thereof by means of a pin 163, 263, 363 and 463, respectively, that the friction clutching elements (46, 47) and the carrier (56) do not include cooperable stop portions (49, 51, 59, 60), that the carrier (56) is not of T-shape in cross section, and that the centering springs (61, 62) have been omitted as not absolutely essential. A further departure is in the formation and location of the friction clutching elements (52, 54) that cooperate with the axially movable friction clutching elements (46, 47). In the first clutch 130, the gear 80 is provided with an integral axially extending annular flange 152 having a conical inner surface to cooperate with a complementary outer surface 148 on the clutch element 146, the gear 80 also having a toothed portion 153 on its hub for cooperation with the positively engageable clutch parts or rockers 157. The gear 81 is similarly provided with a flange 154 having a surface cooperable with the surface 150 on the clutch element 147 and a toothed portion 155 engageable with the clutch parts 157. The clutch 230 has substantially the same formation as the clutch 130, except that the friction clutching surfaces 248 and 250 on the elements 246 and 247, respectively, are of smaller diameter to cooperate with the annular flanges 252 and 254 on the gears 82 and 83. As shown, the gears 82 and 83 are provided with toothed portions 253 and 255, respectively, on their hubs engageable with the positively engageable clutch parts or rockers 257. The clutch 330 is generally reversed from the clutches 130, 230 and 430, being associated with the drive shaft 71, and includes a first clutch element 346 having an inner conical surface 348 cooperable with the flange 352 formed integrally on the gear 79, the gear 79 having a toothed portion 353 on its hub for engagement with the clutch parts or rockers 357. The other friction clutch element 347 has an outer conical surface 350 cooperable with the flange 354 on the gear 86, and the gear 86, or the driven shaft 72 since the same are integral, is provided with a toothed hub 355 cooperable with the clutch parts 357. The clutch 430 is symmetrical, including identical friction clutch elements 446 and 447 having outer conical surfaces 448 and 450 cooperable with radial flanges 452 and 454 secured, respectively, to the gear 88 and 89, the gears 88 and 89 being provided with toothed hubs 453 and 455, respectively, cooperable with the clutch parts or rockers 457. The operation of each of the clutches 130, 230, 330 and 430 will of course be obvious from the foregoing description of the clutch shown in FIGURE 1.

For purposes of selective actuation of the transmission of our invention, hydraulic fluid under pressure is supplied to the four clutches at the selection of the operator and/or automatically through the instrumentality of conventional selective control means well known in the art, the nature and purpose of which will become immediately apparent to those skilled in the art from the following description of the operation of the transmission. The supply of fluid under pressure to the respective fluid cavities in the clutches will be understood by reference to the various clutch parts, and therefore, specific mention of the fluid supply is omitted from the following to facilitate clarification of the specific multiple speed functions of the transmission. It will be understood, of course, that fluid is first supplied to a clutch under relatively high pressure to effect initial actuation, after which the pressure is decreased to maintain the clutch parts in engagement, as has been previously described.

In operation, the disclosed embodiment of the transmission of our invention affords nine forward speed ratios and two reverse speed ratios between the drive shaft 71 and the driven shaft 72. With the drive shaft 71 rotating in a given direction, forward speed ratios are afforded as follows:

The first speed ratio is afforded by actuating the clutches 130 and 430 to couple the clutch elements 146, 157 and 447, 457, respectively, with the clutch portions 152, 153 and 454, 455 of the gears 80 and 89, respectively, whereupon a drive connection from the shaft 71 to the shaft 72 is effected through the gears 75 and 80, the left side of clutch 130, the countershaft 73, the right side of clutch 430 and the gears 89 and 87.

The second speed ratio is afforded by actuation of the clutch parts 246, 257 and 447, 457 of the clutches 230 and 430 to effect a drive connection from shaft 71 through gears 77 and 82, the left side of clutch 230, the countershaft 73, the right side of clutch 430 and the gears 89 and 87 to the driven shaft 72.

The third speed ratio is effected through the gears 78 and 83, the right side of clutch 230, the countershaft 73, the right side of clutch 430, and the gears 89 and 87.

Fourth speed is effected through the left side of the clutch 330, the gears 79 and 84, the countershaft 73, the right side of the clutch 430 and the gears 89 and 87.

The 5th, 6th, 7th and 8th speeds are effected in the same manner as the 1st, 2nd, 3rd and 4th speeds, respectively, with the exception that the left side of the clutch 430 is actuated to connect the countershaft 73 to the driven shaft 72 through the gears 88 and 86, rather than the gears 89 and 87.

Ninth forward speed is effected upon actuation solely of the right side of clutch 330 directly to couple the shafts 71 and 72 through the medium of the clutch parts 347, 354, 355 and 357.

The reverse speeds are both effected through the drive shaft gear 76, the idler 85 and the countershaft gear 81, one speed being effected through the gears 89 and 87 and the other speed through the gears 88 and 86. Specifically, upon actuation of the right side of clutch 130 and the right side of clutch 430, the shafts 71 and 72 are connected through the gear 76, idler 85, gear 81, clutch parts 147, 154, 155, 157 and 156, countershaft 73, clutch parts 456, 457, 455, 447 and 454, gear 89 and gear 87. High reverse speed is effected upon actuation of the right side of clutch 130 and the left side of clutch 430 to connect the shaft 71 through gear 76, idler 85, gear 81, clutch parts 147, 154, 155, 157 and 156, countershaft 73, clutch parts 456, 457, 453, 446 and 452, and gears 88 and 86 to the shaft 72.

From the foregoing, it is to be appreciated that the present invention provides an improved clutch of economical construction affording substantial advantages as enumerated.

While we have described what we regard to be preferred embodiments of our invention, it will be appreciated that various changes, rearrangements and modifications may be made therein without departing from the scope of the invention, as defined by the appended claims.

We claim:

1. In a transmission having a rotatable shaft and a pair of axially spaced gears rotatable with respect to the shaft, a clutch adapted to be positioned coaxially between the gears including a friction clutch surface and a positively engageable clutch part adapted to be connected to each of said gears, first piston means between the gears movable in opposite directions axially of the shaft, a pair of second piston means mounted to opposite sides of said first piston means for movement axially of the shaft, each of said second piston means being operatively associated with a friction clutch surface mounted for rotation with the shaft and engageable with the friction clutch surface adapted to be connected to the adjacent gear, said first piston means being operatively associated with positively engageable clutch means mounted for rotation with the shaft and engageable with the said positively engageable clutch parts, said second piston means each having a greater effective piston area than said first piston means, and fluid supply means for alternately supplying fluid under pressure to one side of said first piston means and the second piston means to the opposite side thereof and to the opposite side of said first piston means and the second piston means to said one side thereof, fluid under pressure actuating the respective first and second piston means in the same direction and in such a manner that the second piston means first frictionally couples the shaft and the respective gear by engagement of the respective friction clutch surfaces and the first piston means then positively connects the shaft and the gear by engagement of said positively engageable clutch means and the clutch part on the respective gear.

2. In a transmission having a rotatable shaft and a gear rotatable with respect to the shaft, a clutch adapted to be positioned coaxially with respect to the shaft including a friction clutch surface and a positively engageable clutch part adapted to be connected to the gear, first movable wall means carrying a friction clutch surface engageable with the said first mentioned clutch surface, second movable wall means operatively carrying a clutch part engageable with the said first mentioned clutch part, both said movable wall means being fixed for rotation with the shaft, and fluid supply means for actuating said first and second movable wall means.

3. A clutch comprising a pair of frictionally engageable clutch surfaces, a pair of positively engageable clutch parts, a pair of simultaneously operable piston means, and common fluid supply means for said piston means, one of said piston means having a relatively large effective piston area exposed to fluid under pressure and the other piston means having a relatively small effective piston area exposed to fluid under pressure, whereby said one piston means initially moves at a more rapid rate than said other piston means, said one piston means being operatively associated with one of said friction clutch surfaces and said other piston means being operatively associated with one of said clutch parts.

4. A clutch comprising a pair of frictionally engageable clutch surfaces, a pair of positively engageable clutch parts, a cylinder, first and second piston means in said cylinder, said cylinder and said pistons defining a pair of connected cavities, a first cavity exposed to one side of said first piston and a second cavity of smaller cross sectional area exposed to the corresponding side of said second piston and the opposite side of said first piston, said second piston carrying one of said friction clutch surfaces and said first piston being operatively associated with one of said clutch parts, and a fluid inlet to said cavities, fluid under pressure introduced into said cavities moving said second piston to engage said friction clutch surfaces and moving said first piston to actuate said one of said clutch parts positively to engage said clutch parts.

5. A clutch means comprising two pairs of friction clutch surfaces, two positively engageable clutch parts one associated with each pair of friction clutch surfaces, a cylinder, double acting first piston means reciprocable in said cylinder, a third positively engageable clutch part operatively associated with said first piston means and engageable with either of said two positively engageable clutch parts, a pair of cylinders in said first piston means each adjacent one friction clutch surface of each of said pairs of friction clutch surfaces, second piston means in each of said cylinders in said first piston means, each of said second piston means being operatively associated with one of the friction clutch surfaces of the pair of friction clutch surfaces adjacent thereto, each of said second piston means having a greater effective piston area than said first piston means, first fluid supply means for supplying fluid under pressure to one side of said first piston means and to one of said second piston means, and second fluid supply means for supplying fluid under pressure to the other side of said first piston means and to the other of said second piston means, fluid under pressure supplied to either of said supply means actuating the second piston means to first engage the respective pair of friction clutch surfaces and actuating said first piston means to secondly engage said third clutch part with the respective one of said two clutch parts.

6. A clutch comprising a rotatable driving member and a rotatable driven member, a carrier fixed to one of said members, at least one rocker fulcrummed on said carrier, a hub slidably mounted on said carrier and engageable with said rocker, said hub defining a cylinder, a piston reciprocably mounted in said cylinder and carrying a friction clutch surface, the other of said members carrying a friction clutch surface to be engaged by the said friction clutch surface carried by said piston and a clutch portion to be positively engaged by said rocker, and a housing defining a second cylinder within which said hub is slidably received, the side of said hub opposite the side thereof in which the cylinder is defined being exposed in said second cylinder, said cylinders being inter-connected and the cylinder defined by said housing having a greater cross sectional area than the cylinder defined by the said hub, whereby, upon introduction of fluid under pressure into said cylinders, said piston is first removed relative to said hub in said housing to engage said friction clutch surface to couple said members, said hub, due to the differential in area between the sides thereof exposed to fluid pressure, being also moved in the same direction as said piston was moved to engage said rocker and rock the same into engagement with said clutch portion carried by said other member positively to couple said members.

7. In a transmission having a rotatable shaft and a pair of axially spaced gears rotatable with respect to the shaft, clutch means adapted to be positioned between the gears including a body member fixed on the shaft and carrying radially movable rockers fulcrummed intermediate their ends adapted to be connected to said body member, clutch means on the adjacent portions of the gears for receiving the opposite ends of said rockers in clutching engagement, an axially shiftable hub on said body member movable selectively toward opposite ends of said rockers to effect clutching engagement of the end of said rockers toward which said hub is moved with the said clutch means adjacent such end, a pair of cone clutch surfaces adapted to be connected respectively to the gears, said hub defining a pair of cylinders in the opposite surfaces thereof facing respectively toward said cone clutch surfaces, a piston reciprocably mounted in each of said cylinders and each having a cone clutch surface engageable with one of the said first mentioned cone clutch surfaces, and a housing defining a cylinder within which said hub is slidably received, a first passage in said hub establishing communication between the portion of the cylinder in said housing to one side of said hub and the cylinder in said hub to the opposite side thereof, a second passage in said hub establishing communication between the portion of said cylinder in said housing to the opposite side of said hub and the cylinder in said one side of said hub, and a pair of fluid inlet ports in said housing to opposite sides of said hub, the area of the respective side of the hub exposed to fluid pressure in said housing cylinder being greater than the area of the opposite side of the hub exposed to fluid pressure in the respective hub cylinder, whereby, upon supply of fluid under pressure to either of said inlet ports, one of said pistons and said hub are actuated to move in one direction first to engage the cone clutch surface on said one piston with its said first mentioned cone clutch surface and thereafter to engage the ends of the rocker in the direction of piston and hub movement with the corresponding clutch means.

8. In a clutch, control apparatus for actuating sequentially engageable portions of two pairs of mechanism, said apparatus comprising a housing defining a cylinder therein, an annular hub reciprocably mounted in said housing and including an outer radial flange received within said cylinder and constituting a double acting piston therein, a pair of fluid inlet ports in said housing communicating with said cylinder to opposite sides of said flange, said hub having an annular groove in each of the two opposite sides thereof inwardly of said flange, a first cross port in said hub establishing communication between one side of said flange and the groove in the opposite side of said hub, a second cross port in said hub establishing communication between the opposite side of said flange and the groove in said one side of said hub, the area of each of said grooves being less than the area of the side of said flange with which it communicates and the differential in the area between each groove and the side of said flange with which it communicates being less than the area of the respective groove, and an annular piston reciprocably mounted in each of said grooves, said pistons each being adapted to carry first engageable portions of different pairs of mechanisms and said hub being adapted to actuate subsequently engageable portions of the two pairs of mechanisms.

9. A clutch comprising a stationary housing defining a cylinder therein, an annular hub reciprocably and rotatably mounted in said housing and including an outer radial flange received within said cylinder and constituting a double acting piston therein, a pair of fluid inlet ports in said housing communicating with said cylinder to opposite sides of said flange, said hub having a concentric annular groove in each of the two opposite sides thereof inwardly of said flange, a first cross port in said hub establishing communication between one side of said flange and the groove in the opposite side of said hub, a second cross port in said hub establishing communication between the opposite side of said flange and the groove in the said one side of said hub, the area of each of said grooves being less than the area of the side of said flange with which it communicates and the differential in area between each groove and the side of said flange with which it communicates being less than the area of the respective groove, an annular piston reciprocably but non-rotatably mounted in each of said grooves coaxially of said hub, friction clutch members operatively associated with each of said pistons, an annular carrier slidably but non-rotatably mounted in said hub coaxially of said hub, housing and pistons, said carrier having a plurality of circumferentially spaced longitudinal slots in the periphery thereof, a rocker fulcrummed intermediate its ends in each of said slots to accommodate movement of the opposite ends thereof radially of said carrier, and positively engageable clutch parts disposed adjacent and radially inwardly of the opposite ends of said rockers, said rockers and said hub having cooperable cam surfaces to effect radial movement of the opposite ends of said rockers upon axial reciprocation of said hub.

10. A clutch comprising a stationary housing defining a cylinder therein, an annular hub reciprocably and rotatably mounted in said housing and including an outer radial flange received within said cylinder and constituting a double acting piston therein, a pair of fluid inlet ports in said housing communicating with said cylinder to opposite sides of said flange, said hub having a concentric annular groove in each of the two opposite sides thereof inwardly of said flange, a first cross port in said hub establishing communication between one side of said flange and the groove in the opposite side of said hub, a second cross port in said hub establishing communicaiton between the opposite side of said flange and the groove in the said one side of said hub, the area of each of said grooves being less than the area of the side of said flange with which it communicates and the differential in area between each groove and the side of said flange with which it communicates being less than the area of the respective groove, an annular piston reciprocably but non-rotatably mounted in each of said grooves coaxially of said hub, friction clutch members operatively associated with each of said pistons, an annular carrier slidably but non-rotatably mounted in said hub coaxially of said hub, housing and pistons, said carriers having a plurality of circumferentially spaced longitudinal slots in the periphery thereof, a rocker fulcrum intermediate its ends in each of said slots to accommodate movement of the opposite ends thereof radially of said carrier, positively engageable clutch parts disposed adjacent and radially inwardly of the opposite ends of said rockers, said rockers and said hub having cooperable cam surfaces to effect radial movement of the opposite ends of said rockers upon axial reciprocation of said hub, said pistons each including a radially inwardly extending flange spaced from the adjacent side of said hub and extending inwardly to said carrier, said carrier at each end thereof defining stops between which the respective piston flange is received to limit reciprocable movement of each piston, first spring means between said carrier and each of said piston flanges biasing said pistons axially inward with respect to said hub, and second spring means between each piston flange and said hub normally centering said hub with respect to said piston flanges, said spring means normally centering said hub and said pistons with respect to said carrier.

References Cited in the file of this patent

UNITED STATES PATENTS

| | | |
|---|---|---|
| 2,065,224 | Hladik | Dec. 22, 1936 |
| 2,412,208 | Dence | Dec. 10, 1946 |
| 2,633,955 | Allen et al. | Apr. 7, 1953 |
| 2,669,880 | Brock et al. | Feb. 23, 1954 |
| 2,712,245 | Lee | July 5, 1955 |
| 2,722,300 | Lapsley | Nov. 1, 1955 |
| 2,753,728 | Kelbel | July 10, 1956 |
| 2,788,874 | Forster | Apr. 16, 1957 |

FOREIGN PATENTS

| | | |
|---|---|---|
| 334,834 | Italy | Jan. 30, 1936 |
| 761,411 | Great Britain | Nov. 14, 1956 |